Figure 1:
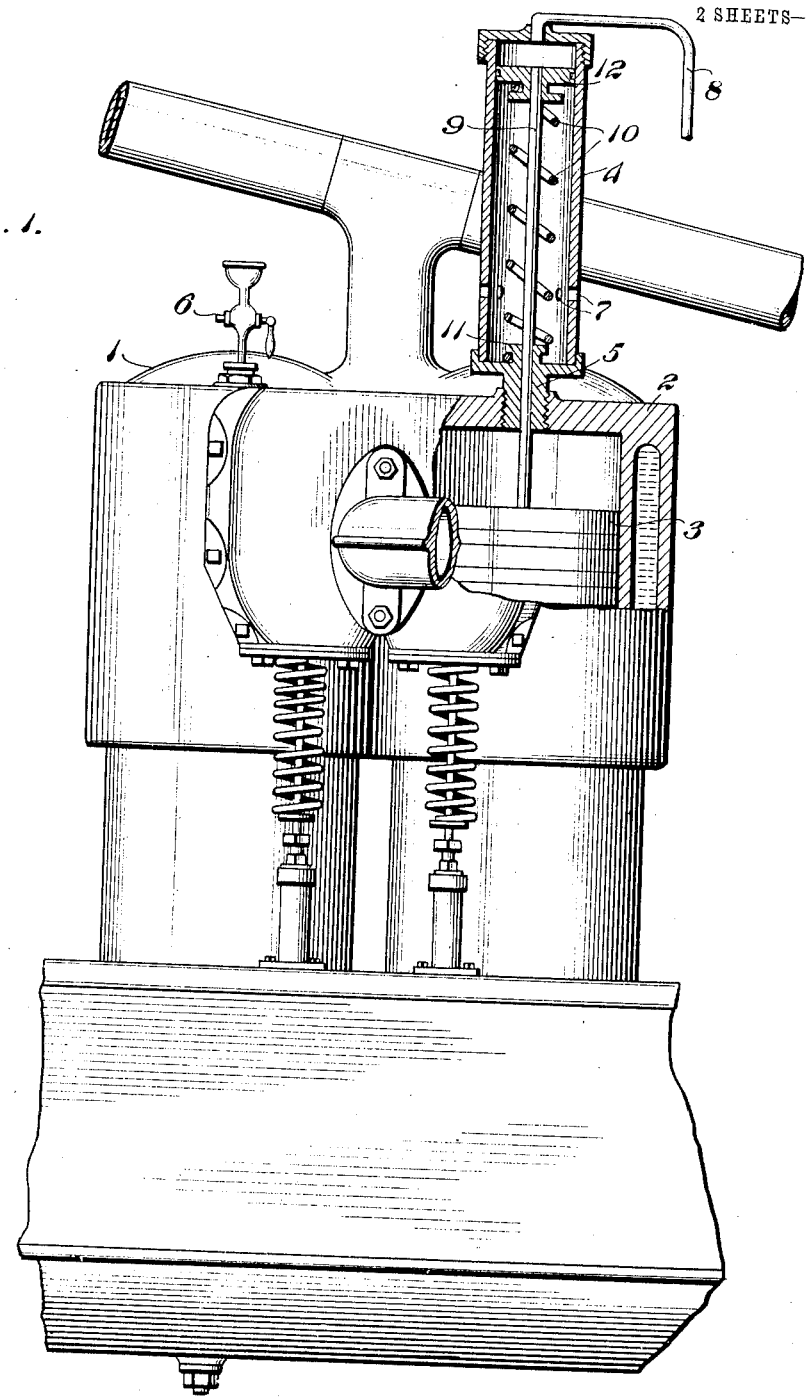

F. G. FOLBERTH.
PUMP ATTACHMENT FOR MOTOR VEHICLE ENGINES.
APPLICATION FILED NOV. 28, 1910.

1,107,054.

Patented Aug. 11, 1914.

2 SHEETS—SHEET 1.

Witnesses
J. Adolph Bishop
C. S. Brown.

Inventor
Frederich G. Folberth
by Foster Frieman Watson & Coit
Attorneys

F. G. FOLBERTH.
PUMP ATTACHMENT FOR MOTOR VEHICLE ENGINES.
APPLICATION FILED NOV. 28, 1910.
1,107,054.
Patented Aug. 11, 1914.
2 SHEETS—SHEET 2.
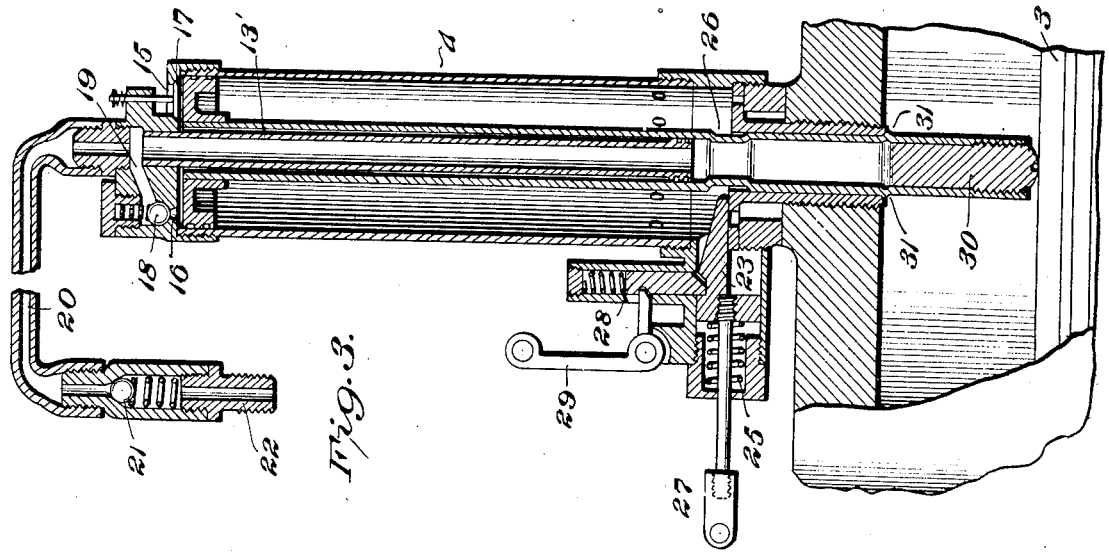
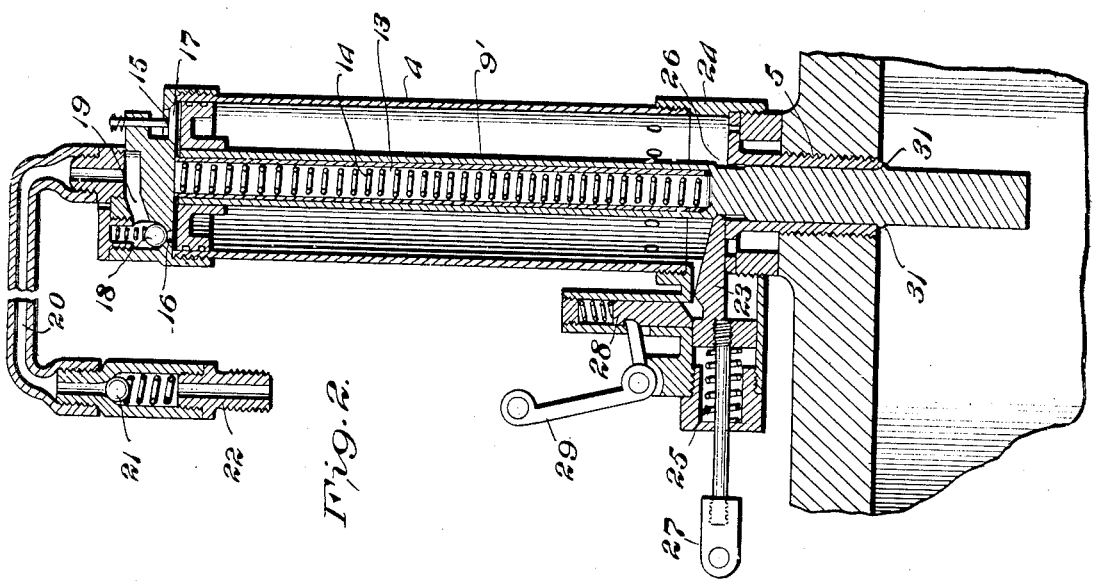

UNITED STATES PATENT OFFICE.

FREDERICK G. FOLBERTH, OF CLEVELAND, OHIO.

PUMP ATTACHMENT FOR MOTOR-VEHICLE ENGINES.

1,107,054.

Specification of Letters Patent. Patented Aug. 11, 1914.

Application filed November 28, 1910. Serial No. 594,526.

*To all whom it may concern:*

Be it known that I, FREDERICK G. FOLBERTH, a citizen of the United States, and resident of Cleveland, county of Cuyahoga, State of Ohio, have invented certain new and useful Improvements in Pump Attachments for Motor-Vehicle Engines, of which the following is a specification.

The present invention relates to an attachment for motor vehicle engines by means of which such an engine is adapted to actuate an air pump for inflating a tire or tires of the vehicle, or for other purposes.

It has been heretofore proposed to employ one of the cylinders of a multiple cylinder explosive engine to actuate such a pump, the sparking mechanism in said cylinder being rendered inoperative and the pump so connected with the engine cylinder that the air or gas compressed therein is admitted to the pump to actuate the piston thereof.

One of the objects of the present invention is to provide a motor vehicle engine with an air pump, the piston of which will be actuated directly by the engine piston instead of by the pressure of air or gas compressed in the engine cylinder and which pump can be actuated if desired without disconnecting or disarranging the ignition apparatus or other part of the engine.

A further object of the invention is to provide such an engine with an attachment which need not be detached from the engine when not in use.

The primary purpose of the invention is effected by providing the air pump with a piston having a rod or stem of such length that it is adapted to extend through a passage or opening in the head of the engine cylinder and into engagement with the engine piston. If the pump is not to be permanently connected with the cylinder, the passage for said piston stem may be that normally provided for some other attachment, for instance a compression relief cock or spark plug, which can be readily removed when it is desired to attach the pump. It is unnecessary to connect the stem of the air pump piston rigidly with the engine piston but the necessary connection between the two pistons can be maintained by any suitable means, such as a spring or the pressure of air previously compressed by the action of the pump and retained in a pipe or conduit leading therefrom, by which means the stem of the pump piston is maintained in contact with the head of the piston in the engine cylinder.

In the accompanying drawing, Figure 1 illustrates in side elevation and partial section a two cylinder explosive engine having an embodiment of the present invention attached to one of its cylinders; Fig. 2 is a vertical sectional view, on an enlarged scale, through the air pump and its connection with the cylinder, showing a slightly modified form of the invention; Fig. 3 is a view similar to Fig. 2 illustrating another modification.

As the improved pump may be employed in connection with engines of various forms or types, it has been thought unnecessary to illustrate an engine structure in detail. In Fig. 1 the reference characters 1, 2, designate two cylinders of an explosive engine, a portion of the side and head of one cylinder being broken away to show the piston 3 therein.

The improved attachment comprises a pump having a barrel or cylinder 4 provided at its lower end with a threaded tubular support 5 adapted to be screwed into a suitably threaded passage or opening formed in the head of the engine cylinder to which it is to be applied. If the pump is to be removably connected with the cylinder said threaded support 5 may be of such size as to fit the passage provided in the cylinder head for the compression cock 6 or other similar detachable member.

In the form of the invention illustrated in Fig. 1 the barrel 4 of the pump is provided with a series of air inlets 7 near the lower end thereof and to an outlet or discharge port in the outer end is connected a tube 8 which is provided with means for connection with a tire of the vehicle. The stem 9 of the pump piston is of such length that it extends into the engine cylinder and is adapted to be held in contact therewith throughout the entire stroke of said engine piston. The contact between the stem 9 and the piston 3 is maintained by a coiled spring 10 which has its ends engaged respectively with an abutment 11 at the lower end of the pump barrel 4 and with a suitable shoulder on the pump piston 12. As the piston 3 moves downward the spring 10 will draw down the pump piston 12 and when the pistons have reached the lower limit of their travel air will enter the pump through the inlets 7 and at the next outward stroke of the piston be forced through the pipe 8 to the tire.

Instead of arranging the spring which maintains contact between the stem of the pump piston and the piston in the engine in the manner shown in Fig. 1, the stem 9' may be made tubular for a portion of its length and fitted about a tubular guide 13 depending from the upper end of the pump and a coiled spring 14 may be arranged within said tube one end thereof bearing against the head of the pump and the other against the lower end of the chamber formed within the piston stem. The action of such spring will be the same as that in the form shown in Fig. 1 but the spring is more compactly arranged and is completely inclosed. In this form of the invention, as shown in Fig. 2, both the inlet 15 and discharge aperture 16 of the pump are formed in the upper end thereof, suitable valves 17, 18, being provided to control said ports; and the discharge port 16 communicates through a duct 19 with a tube 20 which may be provided with a check valve 21 and a coupling member 22, by which it can be connected either directly with a tire or with one end of a flexible tube which is in turn connected with the tire. This form of the invention may be permanently connected with the engine cylinder, the threaded extension 5 thereof being secured in a passage provided therefor and with such a structure it is desirable to provide means whereby when desired the pump piston may be held in its outermost position and disconnected from the piston of the engine. To accomplish this there is provided a radially movable stop 23 mounted in a lateral extension of the pump barrel or the coupling 24 by which said barrel is connected with the threaded support 5. A spring 25 acts to constantly press said stop inwardly and the stem of the pump piston is provided with an annular groove 26 with which said stop alines when the pump piston is at the upper end of its travel. By means of a hand piece 27 the stop 23 may be withdrawn from engagement with the piston stem and a spring pressed latch 28 is adapted to retain said stop in its inoperative position, as shown in Fig. 3. By means of a hand lever 29, the latch piece 28 may be raised so that the spring 25 can act to force the stop inwardly into position to engage the stem of the pump piston.

In the form of the invention shown in Fig. 3, the pressure of air in the pipe 20 is utilized to maintain the pump piston stem in contact with the piston 3 of the engine. In this embodiment of the invention the tubular guide 13' for the pump piston is extended into the head of the pump barrel sufficiently to communicate with the passage 19 therein and the lower end of the piston stem is closed by a plug 30 which may be shorter than the plug which is employed in the form shown in Fig. 2. The stem of the pump piston is preferably provided with an annular bead 31 which limits the outward movement thereof.

The operation and manner of using the improved attachment will be readily understood from the drawings and the foregoing description. It will be seen that in use the pump is actuated directly from the engine piston and a maximum charge of air delivered thereby at each stroke of said piston which air is not affected by the air or mixture of air and gas compressed in the engine cylinder.

It will be seen that the pump piston is actuated directly by the engine piston or with maximum power on its compression stroke and that the spring merely acts to return the pump piston to the lower end of its cylinder and is not the means employed for driving the piston on its compression stroke. According to the present invention, therefore, the necessary high compression required for properly inflating automobile tires may be quickly obtained. The entire outward stroke of the engine piston may be utilized for effecting the compression stroke of the pump piston. Such a construction is superior to those heretofore proposed in which the compression stroke of the pump piston is created by the compression within the engine cylinder. With the latter structure the compression stroke of the pump piston is necessarily considerably shorter than that of the engine piston and it is impossible to obtain the same amount of compression at each operation of the pump, as may be had by the present invention and furthermore said earlier structure is objectionable for the other reasons hereinbefore noted.

It will be seen that the present construction permits of the employment of an air pump having a relatively long stroke and the positive and direct actuation of its piston throughout the entire compression stroke by the engine piston. This is due to the fact that the stem of the pump piston is made of such length that the section thereof which extends into the engine cylinder projects below the plane of the upward limit of movement of the engine piston an extent equal to the maximum stroke of the pump piston. It will also be seen that in the form of pump illustrated in Figs. 2 and 3, in which the inlet and discharge valves of the pump are both located at the upper end of the pump cylinder, said cylinder is provided near its lower end with relief ports or openings so that the downward movement of the pump piston will not be obstructed by compression of air in the pump cylinder beneath the piston.

In case the pump forms a permanent attachment on the engine it is only necessary to disconnect the air pipe 20 from the tire and release the stop 23 so that it will engage the stem of the pump piston and hold the latter in its upper position. When it is desired to use such pump the tube 20 is connected with a tire and the stop 23 withdrawn so that the pump piston will be caused to move with the engine piston throughout the stroke of the latter.

In the foregoing description of the invention, it has been assumed that the attachment is to be employed for inflating the tires of a vehicle, and that the pump is connected directly with such a tire. It will be evident, however, that the pump may be employed to deliver air under pressure for other uses, such for instance as sounding a whistle. Or again the pump need not be directly connected with the tire, whistle, etc., but a suitable tank or receptacle may be provided to receive the compressed air which can be drawn therefrom as required for inflating tires, actuating a whistle, starting the engine or other purpose.

Having described my invention what I claim and desire to secure by Letters-Patent is, 1. The combination with an engine cylinder, of an air pump comprising a cylinder, which is provided with suitable inlet and outlet ports, and a piston, means supporting the pump and providing a passage through the head of the engine cylinder for the stem of the pump piston, said stem being of such length that the section thereof which projects below the upper limit of the path of movement of the piston within the engine cylinder is equal in length to the full stroke of the engine piston, and resilient means coöperating with the pump piston to maintain it in its lowest position, whereby the pump piston is operated directly by the engine piston to compress air in the pump and yieldingly to draw air into the pump cylinder.

2. The combination with an engine cylinder, of an air pump comprising a cylinder and a piston, said cylinder having suitable inlet and outlet ports and supplemental relief ports, means supporting the pump and providing a passage through the head of the engine cylinder for the stem of the pump piston, said stem being of such length that it is adapted to be actuated by the engine piston throughout the stroke of the latter to compress air in the pump, and resilient means coöperating with the pump piston to actuate it to draw air into the pump cylinder.

3. The combination with an engine cylinder, of an air-pump having its cylinder, which is provided with suitable inlet and outlet ports, supported by means providing a passage through the head of the cylinder of the engine and its piston provided with an elongated stem that extends through said passage into position to be directly actuated by the piston in the engine cylinder, and means for maintaining the stem of the pump-piston in contact with the piston of the engine whereby the pump-piston is positively moved by the engine piston throughout the entire outward stroke of the latter.

4. The combination with a motor vehicle engine, of an air-pump having its cylinder, which is provided with inlet and outlet ports, detachably connected with the head of the cylinder of the engine by means providing a passage through said head and having its piston provided with an elongated stem that extends through said passage into position to be directly actuated by the piston in the engine cylinder, and a spring acting to force the stem of the pump-piston into contact with the piston of the engine so that the compression stroke of the pump-piston may be of the same length as the stroke of the engine piston.

5. The herein-described attachment for motor vehicle engines comprising an air-pump having a cylinder provided with suitable inlet and outlet ports and adapted to be attached to the head of the cylinder of a motor vehicle engine by means providing a passage through such head, the piston of said pump having an elongated stem that projects beyond the cylinder and is adapted to extend through the aforesaid passage in the head of the engine cylinder to which the pump is attached into contact with the piston therein at any point in the stroke of the latter, and means for maintaining contact between the stem of the pump-piston and the piston in the engine cylinder.

6. The herein-described attachment for motor vehicle engines comprising an air-pump having a cylinder provided with suitable inlet and outlet ports and adapted to be attached to the head of a cylinder of a motor vehicle engine by means providing a passage through such head, the piston of said pump having an elongated stem that projects beyond the cylinder and is adapted to extend through the aforesaid passage in the head of the engine cylinder to which the pump is attached into contact with the piston therein at any point in the stroke of the latter, and a spring within the pump cylinder acting constantly to project the piston stem from said cylinder.

7. The combination with a motor vehicle engine, of an air pump mounted on the head of a cylinder of the engine and having its piston stem extending through a passage in said head to contact with the engine piston, means acting to hold said stem against the engine piston, whereby the pump will be actuated directly by the engine piston without being connected thereto, a stop adapted to engage said stem at the termination of its outward movement, and means for rendering said stop inoperative.

8. The combination with a motor vehicle engine, of an air pump mounted on the head of a cylinder of said engine by means providing a passage extending through said head to the interior of the cylinder, the stem of the pump piston extending through said passage and adapted to contact with the engine piston, means acting to hold said stem against the engine piston, whereby the pump may be directly actuated by the engine piston without being connected thereto, a spring pressed stop movable radially of said stem and adapted to be engaged therewith when the pistons have reached the end of their outward movement, and means for holding said stop in inoperative position.

9. The herein described air pump comprising a barrel provided with suitable inlet and outlet ports, a piston having its stem projecting through an end of the barrel, means acting to move the piston in a direction to cause the stem thereof to project from the barrel to its maximum extent, an adjustable spring pressed stop adapted to prevent movement of the piston by said means, and a lock for rendering said stop inoperative.

In testimony whereof I affix my signature in presence of two witnesses.

FRED. G. FOLBERTH.

Witnesses:
H. A. ZWIERLEIN,
A. H. FERBERT.